United States Patent [19]
Field et al.

[11] Patent Number: 5,428,616
[45] Date of Patent: Jun. 27, 1995

[54] MEASURING PACKET TRANSMISSION DELAYS

[75] Inventors: Anthony V. Field; Jason B. Brent, both of Wiltshire; Edward Hatala, Wiltshire; John Timms, Berkshire, all of Great Britain

[73] Assignee: Cray Communications Limited, Berkshire, United Kingdom

[21] Appl. No.: 981,940

[22] Filed: Nov. 23, 1992

[30] Foreign Application Priority Data

Nov. 23, 1991 [GB] United Kingdom ............... 9124914

[51] Int. Cl.⁶ ..................... H04J 3/26; H04L 12/56
[52] U.S. Cl. .................................. 370/94.1
[58] Field of Search ............ 370/94.1, 94.2, 94.3, 370/60, 108

[56] References Cited

U.S. PATENT DOCUMENTS

| | | | |
|---|---|---|---|
| 4,817,085 | 3/1989 | De Prycker | 370/108 |
| 5,127,000 | 6/1992 | Henrion | 370/94.1 |
| 5,148,429 | 9/1992 | Kudo et al. | 370/94.2 |

Primary Examiner—Douglas W. Olms
Assistant Examiner—Min Jung
Attorney, Agent, or Firm—Young & Thompson

[57] ABSTRACT

A packet transmission system comprising a network of one or more nodes (1) each comprising a number of inputs connected via packet switching means to a number of outputs each of which has storage means (11) associated with it in which to store a queue of packets to be outputted; characterized in that each node (1) is provided with timer means (14) to measure the time each packet spends in a queue of said storage means (11); and stamping means (12) to add to a time stamp field (TS) of each packet before it is outputted from the node, the time the packet has spent in a queue as measured by the timer means (14).

2 Claims, 2 Drawing Sheets

MEASURING PACKET TRANSMISSION DELAYS

TECHNICAL FIELD

This invention relates to a packet transmission system and a method of measuring the delays of packets in such a system.

It is known in a packet switching system to provide each packet with a time stamp field in which to record delays incurred as the packet traverses the system. In particular, it is known to measure the variable time taken by each packet to traverse each node of a packet switching network and to add this time to the time stamp field. Delays across the node are caused by queuing of the packets in storage means and are random in nature. The time stamp field therefore records an accumulated value of the variable delay in traversing the network, this being an especially important parameter when packets are used to transmit voiceband information, the received quality of which deteriorates unacceptably unless some form of variable delay compensation is provided.

In one known system, U.S. Pat. No. 4,506,358, two time stamp fields are employed, one for the accumulated delay and the other for the arrival time of the packet at a node input. These values are then used with the time that the packet is outputted from the node to update the accumulated delay stamp field. In another known system, disclosed in U.S. Pat. No. 4,894,823, only one time stamp field is employed and this is updated both at the input and output of the node by subtracting the current value in the time stamp field from the time of arrival at the input, and adding the time that the packet is outputted from the node. The use of just one time stamp field reduces the overhead for the packet, but only by introducing an additional time processing step at the node input which in turn adds complexity.

DISCLOSURE OF THE INVENTION

An object of the present invention is to provide a packet transmission system in which variable delays can be measured more simply than in the known systems.

This is achieved according to the invention by measuring the time which each packet spends in an output queue of each node and adding this time to a time stamp field of the packet. The invention assumes that the delay between the arrival of a packet at the input node and the arrival of the same packet in an output queue is substantially fixed, or at least varies by a negligible amount compared with the time spent in an output queue.

DESCRIPTION OF THE DRAWINGS

The invention will now be described by way of example with reference to the accompanying drawings in which.

MODE OF CARRYING OUT THE INVENTION

Figure 1:
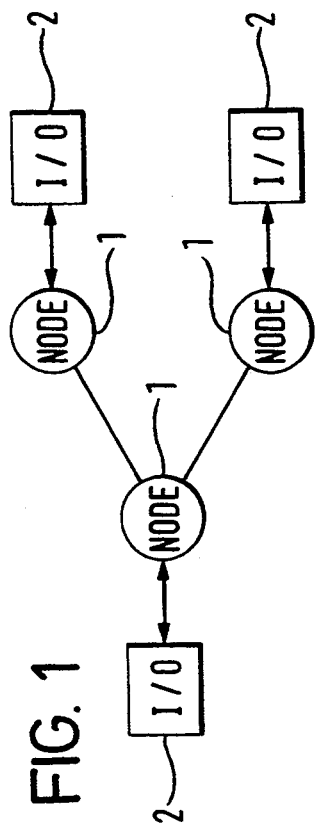
FIG. 1 is a schematic diagram of a packet switching network.
Figure 2:
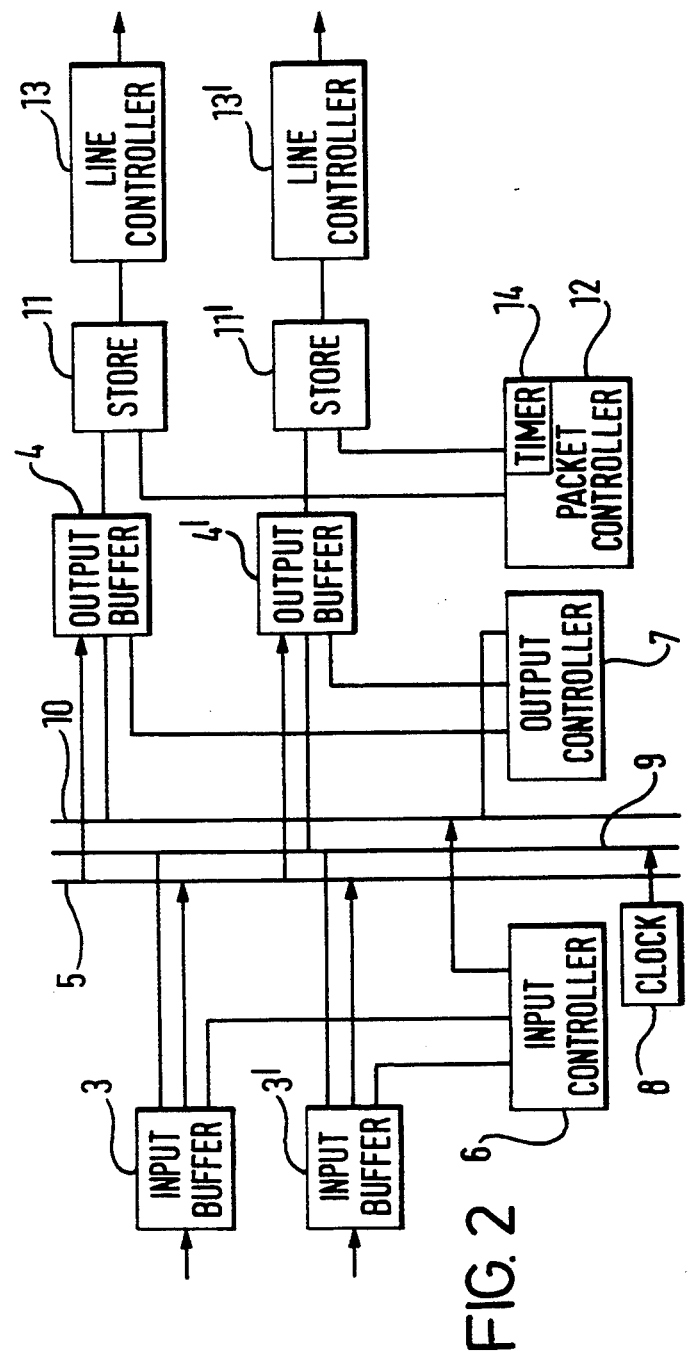
FIG. 2 is a schematic diagram of a packet switching node as used in the network of FIG. 1.

The packet switching network illustrated schematically in FIG. 1 comprises a plurality of interconnected packet switching nodes 1 some of which have input/output terminal devices 2 connected to them so that they can communicate with one another via the network. Data is transferred between the terminals 2 in the form of packets within a frame format known as frame relay. Each packet has a header including a logical address field by means of which it is routed through the network. Each node refers to the logical address field in order to select the appropriate output to which to route it. As shown in FIG. 2, each node includes a number of input buffers 3 to receive incoming packets and transfer these to appropriate output buffers 4 via a parallel bus 5 under the control of input and output controllers 6 and 7.

Figure 3:
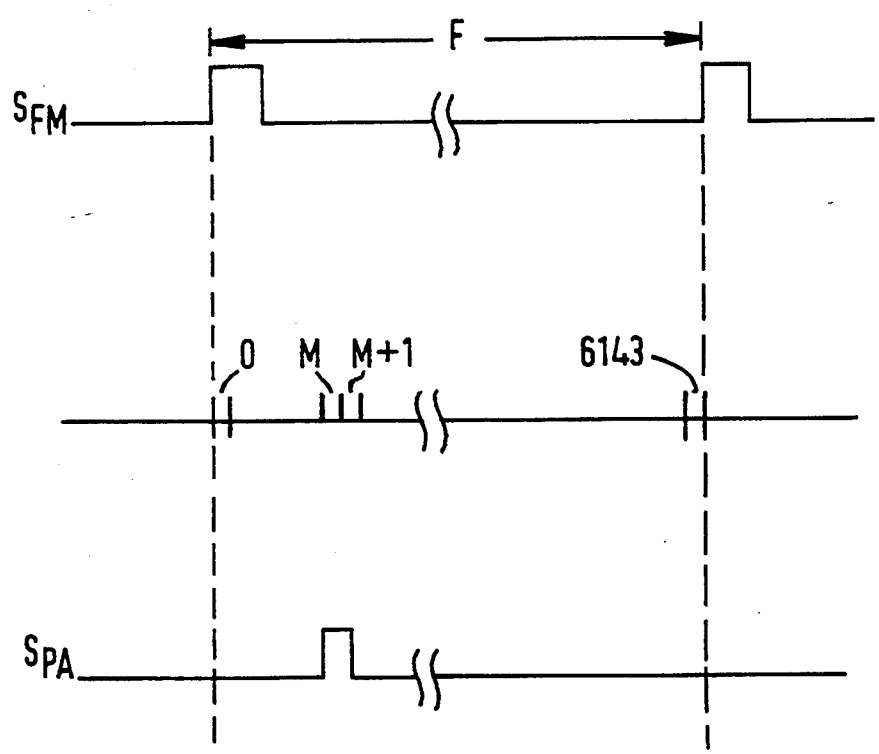
FIG. 3 is a diagram of marker signals used in the node of FIG. 2.

The bus 5 is 8 bits wide and packets are transmitted on it in 8 bit bytes within the slots of a time frame defined by a 4 kHz frame marker signal $S_{FR}$ generated by a clock 8 and applied to a clock line 9 of the bus. Typically, each frame is divided into 6144 time slots, and all of the input and outputs to the bus are synchronised to this slotted frame format by reference to the frame marker signal $S_{FM}$ as shown in FIG. 3. The input controller 6 controls the allocation of the time slots for the transmission of packets across the bus, and allocates pairs of consecutive slots, M and M+1 being a typical pair, for the transmission of each packet so that a multiple of 16 bits is transmitted per frame at a rate of 4 kHz. The output controller 7 shares the slot allocation information with the input controller 6, and controls the receipt of packets from the bus by the output buffers 4, 4', as described hereinafter.

Figure 4:
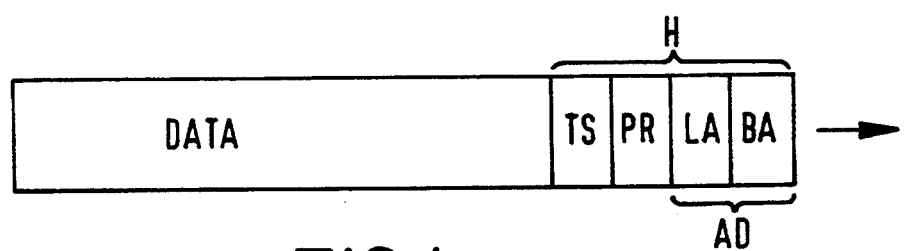
FIG. 4 is a diagram showing the format of a packet within the node of FIG. 2.

Each incoming packet is processed in an input buffer 3, 3' and, as applied to the bus 5, has a header H with a plurality of information fields shown in FIG. 4, including an address field AD, a priority field PR and a time stamp field TS. The address field AD contains a logical address LA derived from the incoming packet and a bus address BA which is added in the input buffer 3 under the control of the input controller 6 and corresponds to the address of one of the output buffers 4 or 4' through which the packet is to be routed to the next node 1 or a terminal device 2. Every time a packet from an input buffer 3 or 3' is applied to the bus 5, the input controller 6 applies a packet address marker $S_{PA}$ to a control line 10 of the bus to coincide with the address field AD in the packet header. This control line 10 is connected to the output controller 7 which responds to the packet address marker $S_{PA}$ by causing all of the output buffers 4, 4' to read the address field of the associated packet. That output buffer 4 or 4' which recognises the bus address BA as its own, is triggered to receive the whole of that packet, which it then passes to a corresponding output packet store 11 or 11' after removing the bus address from the address field.

Each output packet store 11, 11' comprises a buffer which stores the packets it receives in a plurality of FIFO queues each corresponding to a different priority level of the packets. This priority level is identified for each packet by reference to the priority field PR in the packet header which has been added in the input buffer 3 or 3' under the control of the input controller 6 and is deleted once the packet has been directed to a queue. A packet controller 12 controls the order in which the queues are accessed to transfer packets to the output of the store for transmission onwards via a respective line controller 13, 13'. The frequency with which each queue is accessed depends on the priority level of that queue, although any particular queue can be given absolute priority over all others if required, so that this queue is emptied before any of the other queues are accessed.

Considering time delays in the transmission of any packet across the node, there is a minimal variable time delay in the transmission of the packet between the input of the input buffer 3 and input of the output packet store 11. The input buffer 3 only has a limited capacity sufficient to buffer the incoming packet data to adapt it for application to the bus, and this delay is fixed. The bus 5 involves a transmission delay corresponding to a possible timing difference between the arrival of a packet and the occurrence of the next allocated pair of time slots. At maximum, this delay equals the period between successive pairs of time slots, which for a 4 kHz frame marker signal $S_{FR}$ has a maximum value of 250 microseconds. The output buffer 4 operates to receive a complete packet before this is transferred to the output packet store 11, and this incurs a delay corresponding to the packet size. Thus, for any packet switch connection, there is a maximum variable delay time for the transmission of a packet through the node to the output packet store.

The delay incurred in the output packet store 11 is variable and depends upon the priority level of each packet and the length of the corresponding queue to which it is allocated. Under normal operating conditions, this delay is long compared with all other possible variable delays.

The time stamp field TS in the header of each packet is used to provide an accumulative value of the variable transmission delays incurred by storage of a packet in the output packet stores 11, 11' of the network. The packet controller 12 includes a timing function represented as 14 in FIG. 2 which serves to measure the time each packet spends in a queue of each output packet store 11, 11', and adds this time to that recorded in the time stamp field TS of the packet header before the packet is outputted from the store. This can be achieved by the timing function 14 subtracting the current time from the time stamp field TS of each packet as it arrives in an output packet store 11,11', and adding the current time to the time stamp field TS of each packet as it leaves an output packet store 11,11'.

We claim:

1. A method of measuring the transmission delay of a packet in a network of a plurality of nodes comprising measuring the time which the packet spends in an output queue of each node and adding this time to a time stamp field of the packet so as to accumulate in said time stamp field a value of the total time spent by the packet in the output queues only of successive nodes across the network.

2. A packet transmission system comprising a network of a plurality of nodes, each node comprising a number of inputs connected via packet switching means to a number of outputs, storage means associated with each output in which to store a queue of packets to be outputted, timer means associated with each output to measure the time each packet spends in a queue of said storage means, and stamping means provided to add to a time stamp field of each packet only that time that the packet has spent in said queue as measured by the timer means before it is outputted from the node so as to accumulate in said time stamp field a value of the total time spent by the packet in output queues only of successive nodes across the network.

* * * * *